United States Patent [19]
DeNicola, Jr. et al.

[11] Patent Number: 5,414,027
[45] Date of Patent: May 9, 1995

[54] HIGH MELT STRENGTH, PROPYLENE POLYMER, PROCESS FOR MAKING IT, AND USE THEREOF

[75] Inventors: Anthony J. DeNicola, Jr., Newark, Del.; Jeanine A. Smith, West Chester, Pa.; Massimo Felloni, Ferrara, Italy

[73] Assignee: Himont Incorporated, Wilmington, Del.

[21] Appl. No.: 92,344

[22] Filed: Jul. 15, 1993

[51] Int. Cl.⁶ .................... C08J 3/28; C08L 23/10; C08L 23/16; C08L 53/00; C08L 23/26
[52] U.S. Cl. .................... 522/112; 525/322; 525/323; 525/240; 525/88; 525/95; 522/109; 522/157; 522/158; 522/161
[58] Field of Search ............... 525/322, 323, 240, 88; 522/112, 157, 158, 161, 109

[56] References Cited

U.S. PATENT DOCUMENTS

| | | |
|---|---|---|
| 3,717,559 | 2/1973 | Oyama et al. |
| 4,170,664 | 10/1979 | Spenadel et al. |
| 4,626,467 | 12/1986 | Hostetter |
| 4,916,198 | 4/1990 | Scheve et al. |
| 5,047,446 | 9/1991 | DeNicola, Jr. |
| 5,047,485 | 9/1991 | DeNicola, Jr. |
| 5,212,246 | 5/1993 | Ogale .................... 525/323 |
| 5,286,552 | 2/1994 | Lesca et al. ............ 525/323 |
| 5,286,564 | 2/1994 | Cecchin et al. ......... 525/323 |

OTHER PUBLICATIONS

L. Spenadel, "Radiation Crosslinking of Polymer Blends", Radiat. Phys. Chem. vol. 14, pp. 683–697, 1979, discloses radiation crosslinking of ethylene–propylene/polyolefin blends.

G. G. A. Bohm et al., "The Radiation Chemistry of Elastomers and Its Industrial Applications", Rubber Chemistry and technology, vol. 55, pp. 575–668.

D. E. Harmer et al. "Applying Radiation to Chemical Processing", Chemical Engineering, pp. 91–98, May/1971.

H. H. O'Donnell et al., "The Radiation Crosslinking and Scission of Ethylene–Propylene Copolymer Studied by Solid-state Nuclear Magnetic Resonance" British Polymer Journal vol. 17, No. 1, pp. 51–55, 1985.

*Primary Examiner*—Carman J. Seccuro, Jr.

[57] ABSTRACT

Disclosed is a normally solid, high molecular weight, non-linear, substantially gel-free, propylene polymer material characterized by high melt strength due to strain hardening which is believed to be caused by free-end long chain branches of the molecular chains forming the polymer.

Also disclosed is a process for making the polymer by high energy radiation of a normally solid, high molecular weight, linear, propylene polymer in a reduced active oxygen environment, maintaining the irradiated material in such environment for a specific period of time, and then deactivating free radicals in the material.

Further disclosed is the use of the strain hardening polymer in extensional flow operations such as, for example, extrusion coating, film production, foaming and thermoforming.

11 Claims, 2 Drawing Sheets

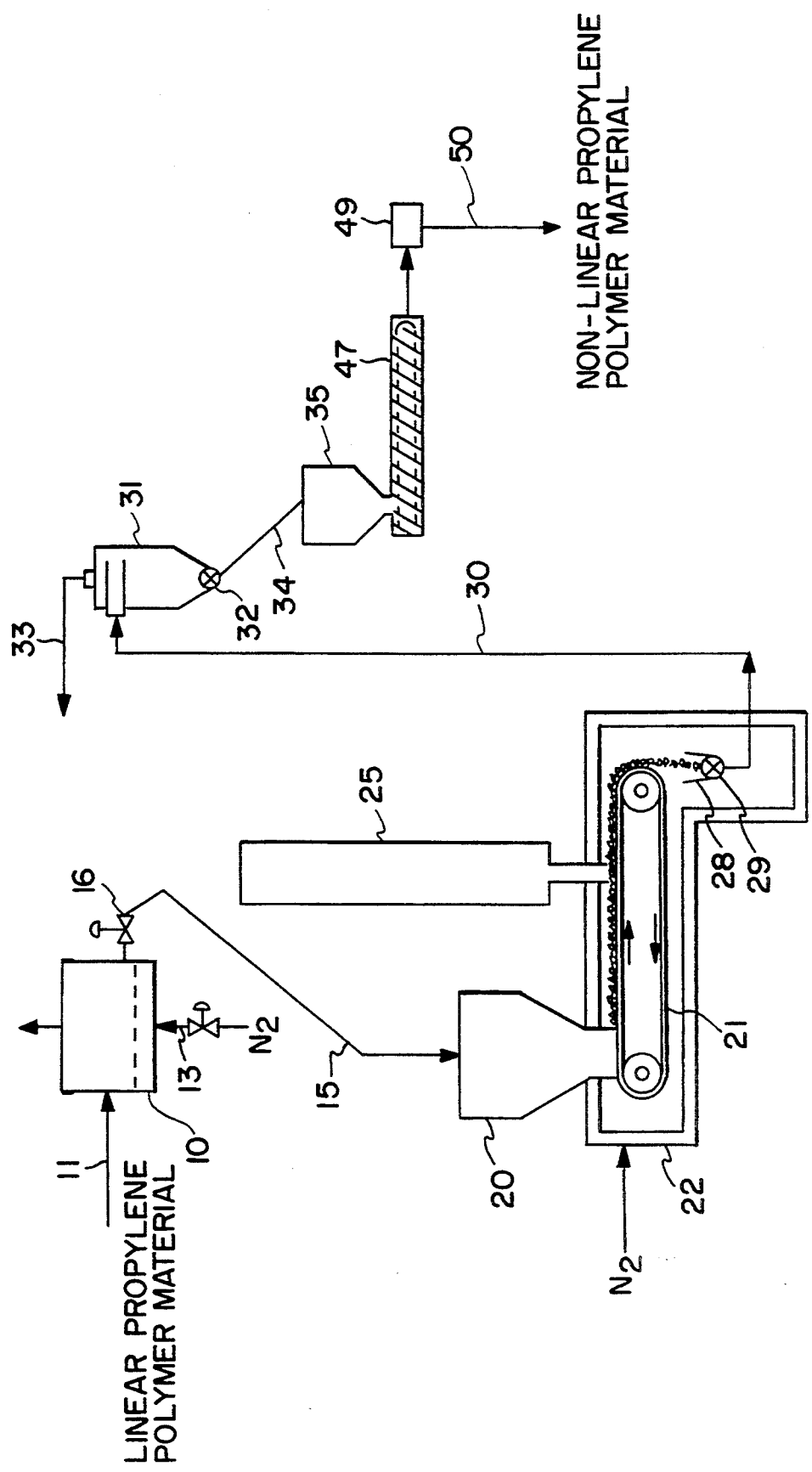

HIGH MELT STRENGTH, PROPYLENE POLYMER, PROCESS FOR MAKING IT, AND USE THEREOF

FIELD OF INVENTION

This invention resides in the chemical arts. More particularly, it relates to the chemical art having to do with synthetic resins derived from alpha or 1-olefins. Specifically, it relates to impact modified synthetic resins, also known as heterophasic resin, formed by the sequential polymerization of propylene and other olefins.

BACKGROUND OF THE INVENTION

Radiation of polymer materials as a method of chemical processing is known in the art. For example, Bohm and Tveekrem, "The Radiation Chemistry of Elastomers And Its Industrial Application", Rubber Chemistry and Technology, vol. 55, 575–668, discuss the effect of radiation of elastomers, such as ethylene-propylene copolymers and terpolymers; and Harmer and Ballantine, "Applying Radiation to Chemical Processing", Chemical Engineering, 91–98, May/ 1971 which describes various types of radiation.

The irradiation of elastomers, such as ethylene-propylene copolymer rubbers or ethylene-propylene-diene terpolymer rubbers is a viable method, or alternative, for crosslinking said materials, as described in O'Donnell and Whittaker, "The Radiation Crosslinking and Scission of Ethylene-Propylene Copolymers Studied by Solid-state Nuclear Magnetic Resonance", British Polymer Journal, vol. 17, no.1, 51–55, 1985. The crosslinking of elastomers is desirable in fabricated parts. U.S. Pat. No. 4,170,664 describes a process for the production of cross-linked resilient automotive body components having a cured surface coating from a thermoplastic elastomeric composition.

It is also known that by irradiating normally solid, linear, $C_{2-4}$ alpha-olefin homopolymers and random copolymers of propylene with ethylene and/or $C_{4-8}$ alpha-olefins, according to the processes of U.S. Pat. Nos. 4,916,198, 5,047,446 and 5,047,485, polymers are obtained having high melt strength or strain hardening (an increased resistance to stretching during elongation of the molten material) without crosslinking and gelation.

However, when irradiated $C_{2-4}$ alpha-olefin homopolymers and random copolymers of propylene with ethylene and/or $C_{4-8}$ alpha-olefins are blended with irradiated or non-irradiated elastomers to obtain better impact strength, the melt strength suffers.

The irradiation of heterophasic resins by conventional radiation methods has resulted in a heterophasic resin having melt strength, but severe gelation and high degree of crosslinking, which are undesirable in foam applications.

Thus, there is a need for high rubber heterophasic resins having good melt strength without substantial gelation or a high degree of crosslinking.

SUMMARY OF THE INVENTION

This invention in one aspect comprises a normally solid, high molecular weight, non-linear, substantially gel-free, propylene polymer material, the molecular chains of which have a substantial amount of free-end long branches, a significant strain hardening elongational viscosity and enhanced melt strength, selected from the group consisting essentially of:

(1) a propylene polymer composition consisting essentially of:

(a) from 10 to 50% of a propylene homopolymer having an isotactic index of from 80 to 99%, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and an alpha-olefin, as defined above in (a)(ii), wherein said copolymer contains from 85 to 99% propylene and having an isotactic index greater than 80 to 99%, (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98% of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10% and the amount of ethylene and alpha-olefin present is from 20% to less than 40%; and (iii) ethylene and an alpha-olefin, as defined in (a)(ii), containing from 20 to less than 40% of the alpha-olefin, and optionally containing 0.5 to 10% of a diene, said copolymer fraction being soluble in xylene at ambient temperature, and having an intrinsic viscosity preferably of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is preferably from about 65% to 80%, the weight ratio of (b)/(c) is preferably from 0.1 to about 0.3 and the total content of ethylene or $C_{4-8}$ alpha-olefin or combination thereof in (b+c) is less than 50%; and (2) a propylene polymer composition consist essentially of:

(a) 10–60 parts by weight of homopolymer polypropylene with isotactic index greater than 90 to 99, or of crystalline propylene copolymer with ethylene, with a $CH_2$=CHR olefin where R is a 2–6 carbon alkyl radical, or combinations thereof, containing over 85% by weight of propylene and having an isotactic index greater than 85 to 94%;

(b) 8–40 parts by weight of a semi-crystalline, polymer fraction containing ethylene and propylene, having an ethylene content greater than 50% and insoluble in xylene at room temperature;

(c) 30–60 parts by weight of an amorphous ethylene-propylene copolymer fraction containing optionally small proportions of a diene, soluble in xylene at room temperature and containing 40 to 70% by weight ethylene.

This invention in another aspect provides a practical process for converting normally solid, high molecular weight, linear, propylene polymer material into normally solid, high molecular weight, non-linear, substantially gel-free, propylene polymer material, that has significant strain hardening elongational viscosity and enhanced melt strength comprising:

(1) irradiating said linear, propylene polymer material (a) in an environment in which the active oxygen concentration is established and maintained at less than about 15% by volume of said environment (b) with high energy ionizing radiation at a dose rate in the range from about 1 to about $1 \times 10^4$ megarads per minute for a period of time sufficient for a substantial amount of chain scission of the linear, propylene polymer to occur, but insufficient to cause gelation of the material;

(2) maintaining the thus irradiated material in such an environment for a period of up to one hour; and (3) then treating the irradiated material while in such an environment to deactivate substantially all the free radicals present in the irradiated material.

DETAILED DESCRIPTION OF THE INVENTION

All parts and percentages used in this application are by weight unless otherwise specified. Ambient or room temperature is approximately 25° C.

Said propylene polymer material of the present invention is a normally solid, high molecular weight, non-linear, substantially gel-free propylene polymer material of:

(1) a propylene polymer composition consisting essentially of:
(a) from 10 to 50% of a propylene homopolymer, preferably from 10 to 40%, and most preferably from 20 to 35%, having an isotactic index of from 80 to 99%, and preferably from 85 to 99%, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and an alpha-olefin, as defined above in (a)(ii), wherein said copolymer contains from 85 to 99%, and preferably from 90 to 97% propylene and having an isotactic index greater than 80 to 99%, preferably greater than 85 to 98%, (b) from 5 to 20% of a semi-crystalline, essentially linear copolymer fraction, preferably from 7 to 15%, having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, preferably from 80 to 95%, of both ethylene and alpha-olefin; and (iii) ethylene and an alpha-olefin, as defined in (a)(ii), containing over 55% up to 98%, preferably from 80 to 95%, of said alpha-olefin, which copolymer is insoluble in xylene at room or ambient temperature, and (c) from 40 to 80% of a copolymer fraction, preferably 50 to 70%, selected from the group consisting of a copolymer of (i) ethylene and propylene wherein the copolymer contains from 20% to less than 40%, preferably from 20 to 38%, most preferably 25 to 38% ethylene; (ii) ethylene, propylene, and an alpha-olefin, as defined in (a)(ii), wherein the alpha-olefin is present in an amount of from 1 to 10%, preferably from 1 to 5%, and the amount of ethylene and alpha-olefin present is from 20% to less than 40%; and (iii) ethylene and an alpha-olefin, as defined in (a)(ii), containing from 20 to less than 40%, preferably 20 to 38%, and most preferably 25 to 38% of the alpha-olefin, and optionally containing 0.5 to 10%, preferably 1 to 5% of a diene, said copolymer fraction being soluble in xylene at ambient temperature, and having an intrinsic viscosity preferably of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is preferably from about 65% to 80%, the weight ratio of (b)/(c) is preferably from 0.1 to about 0.3 and the total content of ethylene or $C_{4-8}$ alpha-olefin or combination thereof in (b+c) is less than 50%, and preferably from 20 to 45%; or (2) a propylene polymer composition consist essentially of:
(a) 10–60 parts by weight of homopolymer polypropylene with isotactic index greater than 90 to about 99%, or of crystalline propylene copolymer with ethylene, with a $CH_2$=CHR olefin where R is a 2–6 carbon alkyl radical, or combinations thereof, containing over 85% by weight of propylene and having an isotactic index greater than 85 to 99%;

(b) 8–40 parts by weight of a semi-crystalline, polymer fraction containing ethylene and propylene, having an ethylene content greater than 50%, preferably from 50 to 99%, and insoluble in xylene at room temperature;

(c) 30–60 parts by weight of an amorphous ethylene-propylene copolymer fraction containing optionally small proportions of a diene, soluble in xylene at room temperature and containing 40 to 70% by weight ethylene.

The propylene polymer material treated according to the process of this invention is a normally solid, high molecular weight, linear, propylene polymer material selected from the group consisting essentially of:

(1) a propylene polymer composition consisting essentially of:
(a) from 10 to 50% of a propylene homopolymer, preferably from 10 to 40%, and most preferably from 20 to 35%, having an isotactic index of from 80 to 99%, and preferably from 85 to 99%, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and an alpha-olefin, as defined above in (a)(ii), wherein said copolymer contains from 85 to 99%, and preferably from 90 to 97% propylene and having an isotactic index greater than 80 to 99%, preferably greater than 85 to 98%, (b) from 5 to 20% of a semi-crystalline, essentially linear copolymer fraction, preferably from 7 to 15%, having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, preferably from 80 to 95%, of both ethylene and alpha-olefin; and (iii) ethylene and an alpha-olefin, as defined in (a)(ii), containing over 55% up to 98%, preferably from 80 to 95%, of said alpha-olefin, which copolymer is insoluble in xylene at room or ambient temperature, and (c) from 40 to 80% of a copolymer fraction, preferably 50 to 70%, selected from the group consisting of a copolymer of (i) ethylene and propylene wherein the copolymer contains from 20% to less than 40%, preferably from 20 to 38%, most preferably 25 to 38% ethylene; (ii) ethylene, propylene, and an alpha-olefin, as defined in (a)(ii), wherein the alpha-olefin is present in an amount of from 1 to 10%, preferably from 1 to 5%, and the amount of ethylene and alpha-olefin present is from 20% to less than 40%; and (iii) ethylene and an alpha-olefin, as defined in (a)(ii), containing from 20 to less than 40%, preferably 20 to 38%, and most preferably 25 to 38% of the alpha-olefin, and optionally containing 0.5 to 10%, preferably 1 to 5%of a diene, said copolymer fraction being soluble in xylene at ambient temperature, and having an intrinsic viscosity preferably of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is preferably from about 65% to 80%, the weight ratio of (b)/(c) is preferably from 0.1 to about 0.3 and the total content of ethylene or $C_{4-8}$ alpha-olefin or combination thereof in (b+c) is less than 50%, and preferably from 20 to 45%, having at least one melt peak, determined by DSC, present at temperatures higher than 120° C., and at least one peak, relative to the vitreous transition, present at temperatures from −10° C. and −35° C. In addition, these compositions have a flexural modulus of less than 150 MPa, generally from 20 and 100 Mpa; a tensile strength at yield of from 10 to 20 MPa, elongation at break over 400%; a tension set, at 75% strain, from 20% to 50%; a Shore D hardness from 20 and 35; haze value of less than 40%, preferably less than 35%, and do not break (no brittle impact failure) when an IZOD impact test is conducted at −50° C.; and (2) a propylene polymer composition consisting essentially of:

(a) 10–60 parts by weight of homopolymer polypropylene with isotactic index greater than 90to about 99%, or of crystalline propylene copolymer with ethylene, with a $CH_2=CHR$ olefin where R is a 2–6 carbon alkyl radical, or combinations thereof, containing over 85% by weight of propylene and having an isotactic index greater than 85 to 99%;

(b) 8–40 parts by weight of a semi-crystalline, polymer fraction containing ethylene and propylene, having an ethylene content of greater than 50%, preferably from 50 to 99% and insoluble in xylene at room temperature;

(c) 30–60 parts by weight of an amorphous ethylene-propylene copolymer fraction containing optionally small proportions of a diene, soluble in xylene at room temperature and containing 40 to 70% by weight ethylene, having at least one melting peak, determined by DSC, present at temperatures higher than 140° C.; a flex modulus of less than 700 MPa, preferably from 200 to 500 MPa; a VICAT softening point greater than 50° C.; a Shore A hardness greater than 80 and a Shore D hardness greater than 30; a tension set, at 75% strain, lower than 60%, and preferably from 20 to 50%; a tensile stress of greater than 6 MPa, and preferably from 8 to 20 MPa and a notched Izod resilience at −20° and −40° C. greater than 600 J/m.

The high molecular weight, linear, propylene polymer material treated according to the process of this invention under the broadest concepts of the process can be in any physical form, for example, spherical, granules, pellets, film, sheet, and the like. However, in preferred embodiments of the process of this invention, the linear, propylene polymer material is in a finely divided condition with satisfactory results being obtained at an average spherical or pellet particle size of about 0.5 to 7 mm.

As used herein, "high molecular weight" means weight average molecular weight of at least about 100,000.

Intrinsic viscosity, also known as the limiting viscosity number, in its most general sense is a measure of the capacity of a polymer molecule to enhance the viscosity of a solution. This depends on both the size and the shape of the dissolved polymer molecule. Hence, in comparing a nonlinear polymer with a linear polymer of substantially the same weight average molecular weight, it is an indication of configuration of the nonlinear polymer molecule. Indeed, the above ratio of intrinsic viscosities is a measure of the degree of branching of the nonlinear polymer. A method for determining intrinsic viscosity of propylene polymer material is described by Elliott et al., *J. App. Poly. Sci.*, 14, pp 2947–2963 (1970). In this specification the intrinsic viscosity in each instance is determined with the polymer dissolved in decahydronaphthalene at 135° C.

Melt tension provides an indicator of the melt strength of the material. Melt tension is determined with a Gottfert Rheotens melt tension apparatus from Gottfert Inc. by measuring the tension of a strand of molten polymer material in centi-newtons as follows: the polymer to be examined is extruded at an extrusion rate of 0.13 cc/sec. at an apparent shear rate of approximately 15 reciprocal seconds and temperature of from 140° C. to 200° C. through a capillary 20 mm long and 2 mm in diameter; the strand is then subjected to stretching using a drawing system with a constant acceleration rate based on the particular material. The tension resulting from the above drawing is measured (in centi-newtons), The higher the melt tension means the greater the melt strength values which, in turn, are indicative of the particular material's strain hardening ability.

Elongational viscosity is the resistance of a fluid or semifluid substance to elongation. It is a melt property of a thermoplastic material, that can be determined by an instrument that measures the stress and strain of a specimen in the melt state when subjected to tensile strain at a constant rate. One such instrument is described in, and shown in FIG. 1 of, Munstedt, J. Rheology, 23, (4), 421–425, (1979). A commercial instrument of similar design is the Rheometrics RER-9000 extensional rheometer. Molten, high molecular weight, linear, propylene polymer material exhibits elongational viscosity which, as it is elongated or drawn at a constant rate from a relatively fixed point, tends to increase for a distance dependent on the rate of elongation, and then to decrease rapidly until it thins to nothing—so-called ductile or necking failure. On the other hand, the molten propylene polymer material of this invention, that is of substantially the same weight average molecular weight and at substantially the same test temperature as the corresponding, molten, high molecular weight, linear, propylene polymer material, exhibits elongational viscosity which, as it is elongated or drawn from a relatively fixed point at substantially the same rate of elongation tends to increase over a longer distance, and it breaks or fails by fracture—so-called brittle or elastic failure. These characteristics are indicative of strain hardening. Indeed, the more long chain branching the propylene polymer material of this invention has the greater the tendency of the elongational viscosity to increase as the elongated material approaches failure. This latter tendency is most evident when the branching index is less than about 0.8.

The stretch recovery or tension set of the material of this invention is a measure of the materials elasticity. Stretch recovery is determined by measuring the permanent deformation in a molded sample elongated to high deformation on a tensile testing instrument and then allowed to relax for a preset period of time. For the purpose of this inventions stretch recovery is defined as the permanent deformation, measured after 30 minutes, in a specimen elongated to break at a cross head speed of 20 in./min at room temperature. It can be expressed as a percent permanent deformation relative to the original gauge length of the undeformed specimen or as a percent of break elongation of the material.

Because the irradiation results in chain scission, even though there is recombination of chain fragments to reform chains, as well as joining of chain fragments to chains to form branches, there can be a net reduction in weight average molecular weight between the starting material and the end product, the desired substantially branched, high molecular weight, non-linear, propylene polymer material. In general, the intrinsic viscosity of the starting, linear, propylene polymer material, which is indicative of its molecular weight, should be in general about 1–25, and preferably 2–6, to result in an end product with an intrinsic viscosity of 0.8–25, and preferably 1–3. However, linear, propylene polymer material with intrinsic viscosities higher and lower than these general values are within the broader scope of this invention.

The active oxygen content of the environment in which the three process steps are carried out is a critical factor. The expression "active oxygen" herein means oxygen in a form that will react with the irradiated material and more particularly the free radicals in the material. It includes molecular oxygen (which is the form of oxygen normally found in air). The active oxygen content requirement of the process of this invention can be achieved by use of vacuum or by replacing part or all of air in the environment by an inert gas such as, for example, nitrogen.

Linear, propylene polymer material immediately after it is made is normally substantially free of active oxygen. Therefore, it is within the concepts of this invention to follow the polymerization and polymer work-up steps (when the propylene polymer material is not exposed to air) with the process of this invention. However, in most situations the linear, propylene polymer material will have an active oxygen content because of having been stored in air, or for some other reason. Consequently, in the preferred practice of the process of this invention the linear, propylene polymer material is first treated to reduce its active oxygen content. A preferred way of doing this is to introduce the material into a bed of the same blown with nitrogen, the active oxygen content of which is equal to or less than about 0.004% by volume. The residence time of the material in the bed generally should be at least about 5 minutes for effective removal of active oxygen from the interstices of the particles of the material, and preferably long enough for the material to be in equilibrium with the environment.

Between this preparation step and the irradiation step, the prepared, linear, propylene polymer material should be maintained in an environment in which the active oxygen concentration is less than about 15%, preferably less than 5% in a gas conveyance system, and more preferably 0.004%, by volume of the environment. In addition, temperature of the linear, propylene polymer material should be kept above the glass transition temperature of the amorphous fraction of the material, generally at less than about 40° C. and preferably at about 25° C., because of the increase in temperature of the material that occurs in the irradiation step.

In the irradiation step the active oxygen concentration of the environment preferably is less than about 5% by volume, and more preferably less than about 1% by volume. The most preferred concentration of active oxygen is 0.004% by volume.

In the irradiation step, the ionizing radiation should have sufficient energy to penetrate to the extent desired the mass of linear, propylene polymer material being radiated. The energy must be sufficient to ionize the molecular structure and to excite atomic structure, but not sufficient to affect atomic nuclei. The ionizing radiation can be of any kind, but the most practical kinds comprise electrons and gamma rays. Preferred are electrons beamed from an electron generator having an accelerating potential of 500–4,000 kilovolts. In the case of propylene polymer material without a polymerized diene content, satisfactory results are obtained at a dose of ionizing radiation of about 0.5–7 megarads, preferably 2–6 megarads, delivered generally at a dose rate of about 1–10,000 megarads per minute, and preferably about 18–2,000 megarads per minute. In the case of propylene polymer material having a polymerized diene content, satisfactory results are obtained with a dose of about 0.20 to about 2.0 megarads, preferably about 0.5 to about 1.5 megarads, delivered at the foregoing dose rates.

The term "rad" is usually defined as that quantity of ionizing radiation that results in the absorption of 100 ergs of energy per gram of irradiated material, regardless of the source of radiation. As far as the instant invention is concerned, the amount of energy absorbed by the propylene polymer material when it is irradiated usually is not determined. However, in the usual practice of the process energy absorption from ionizing radiation is measured by the well known conventional dosimeter, a measuring device in which a strip of fabric containing a radiation sensitive dye is the energy absorption sensing means. Hence, as used in this specification the term "rad" means that quantity of ionizing radiation resulting in the absorption of the equivalent of 100 ergs of energy per gram of the fabric of a dosimeter placed at the surface of the propylene polymer material being irradiated, whether in the form of a bed or layer of particles, or a film, or a sheet.

The second step of the process of this invention should be performed in a period of time generally in the range from about one minute to about one hour, and preferably about 2-30 minutes. A minimum time is needed for sufficient migration of propylene polymer chain fragments to free radical sites and for combination thereat to reform complete chains, or to form long branches on chains. A radical migration time less than one minute, for example, about a half minute, is within the broader concepts of this invention, but is not preferred because the amount of resulting free-end long chain branching is quite low.

The final step of the process, the free radical deactivation or quenching step, can be performed by the application of heat or by the addition of an additive that functions as a free radical trap, such as, for example, methyl mercaptan.

In one embodiment of the process the application of heat comprises extruding the irradiated propylene polymer material at about 200° C. At this temperature the irradiated propylene polymer material is melted. As a result, quenching of the free radicals is substantially complete. In this embodiment, prior to the extrusion or melt compounding, the irradiated propylene polymer material can be blended with other polymers, for example, linear, propylene polymer material, if desired, and additives such as, for example, stabilizers, pigments, fillers, and the like. Alternatively, such additives can be incorporated as a side stream addition to the extruder.

In another embodiment of the inventive process the application of heat is achieved by introducing the irradiated propylene polymer material into a fluidized bed or a staged fluid bed system in which the fluidizing medium is, for example, nitrogen or other inert gas. The bed or beds is or are established and maintained in a temperature range of at least about 60° C. up to about 130° C. and preferably 80°-120° C., with the average residence time of the irradiated propylene polymer material in the fluid bed or beds being from about 5 minutes to about 120 minutes, with about 20-30 minutes being optimum.

The product thus obtained is a normally solid, high molecular weight, non-linear, substantially gel-free, propylene polymer material characterized by strain hardening and enhanced melt strength.

By "substantially gel-free", as used herein, it is meant that the gel content of the material is from 0 to less than 3%.

Although the process of the invention can be carried out on a batch basis, preferably it is performed on a continuous basis. In one continuous embodiment of the process the finely divided, linear, propylene polymer material, either with or without the preparation step, depending on the active oxygen content of the material, is layered on a traveling belt in the required environment. The thickness of the layer depends on the desired extent of penetration of the ionizing radiation into the layer and the proportion of linear, propylene polymer material desired in the final end product. The speed of travel of the traveling belt is selected so that the layer of finely divided, propylene polymer material passes through the beam or beams of ionizing radiation at a rate to receive the desired dose of ionizing radiation. After having received the desired dose of ionizing radiation, the irradiated layer can be left on the traveling belt in said environment for the period of time for free-radical migration and combination to occur, and then removed from the belt, and introduced into an extruder operated at a melt temperature of the irradiated material, or, in another specific embodiment introduced into a heated bed, or a staged system of heated beds, of particles of irradiated material fluidized with nitrogen or other inert gas. In either embodiment, the irradiated material after at least substantially all of the free radicals therein are deactivated is discharged into the atmosphere and quickly cooled to room temperature. In another embodiments the irradiated, propylene polymer material is discharged from the belt and conveyed in the required environment to a holding vessel, the interior of which has the required environment, and held in the vessel to complete the requisite free radical migration time. The irradiated material then is introduced into an extruder operated at a melt temperature of the irradiated material or is introduced into a heated, inert gas fluidized bed, or a staged system of fluidized beds, of irradiated particles of propylene polymer material and, after quenching of the free radicals, the irradiated propylene polymer material is discharged into the atmosphere.

This invention in still another aspect comprises the extensional flow use of the strain hardening, propylene polymer material of this invention. Extensional flow occurs when the propylene polymer material in the molten condition is pulled in one or more directions at a rate faster than it would normally flow in those directions. It happens in extrusion coating operations in which a melted coating material is extruded on to a substrate such as a moving web of paper or metal sheet, and the extruder or substrate is moving at a higher rate than the extrusion rate. It takes place in film production when the molten film is extruded and then stretched to the desired thinness. It is present in thermoforming operations in which a molten sheet is clamped over a plug mold, vacuum is applied and the sheet is pushed into the mold. It occurs in the manufacture of foamed articles, such as sheets, beads, cups and plates, in which molten propylene polymer material is expanded with a foaming agent. The strain hardening propylene polymer material of this invention is particularly useful as part of (for example from as little as 0.5% by weight to as much as 95% or more by weight) or as substantially all of the molten plastic material used in these and other melt processing methods (for example, profile extrusion, as in the melt spinning of fibers) for making useful articles. In the case of the strain hardened propylene polymer material of this invention, it is particularly useful when blended with a normally solid, predominantly isotactic, semi-crystalline, linear, propylene polymer material for use in melt processing and other operations for making useful articles.

This invention is further illustrated by the accompanying drawings which form a material part of these disclosures, and by the following examples.

BRIEF DESCRIPTION OF THE DRAWINGS

FIG. 2 is a schematic flow sheet of a preferred embodiment of a continuous process for converting, for example, normally solid, linear propylene polymer material into a normally solid, non-linear, substantially gel-free, propylene polymer material with strain hardening and enhanced melt strength, without the additive hopper 37, screw feeder 38, bulk feed hopper 41 and screw feeder 42.

DESCRIPTION OF PREFERRED EMBODIMENTS

Figure 1:
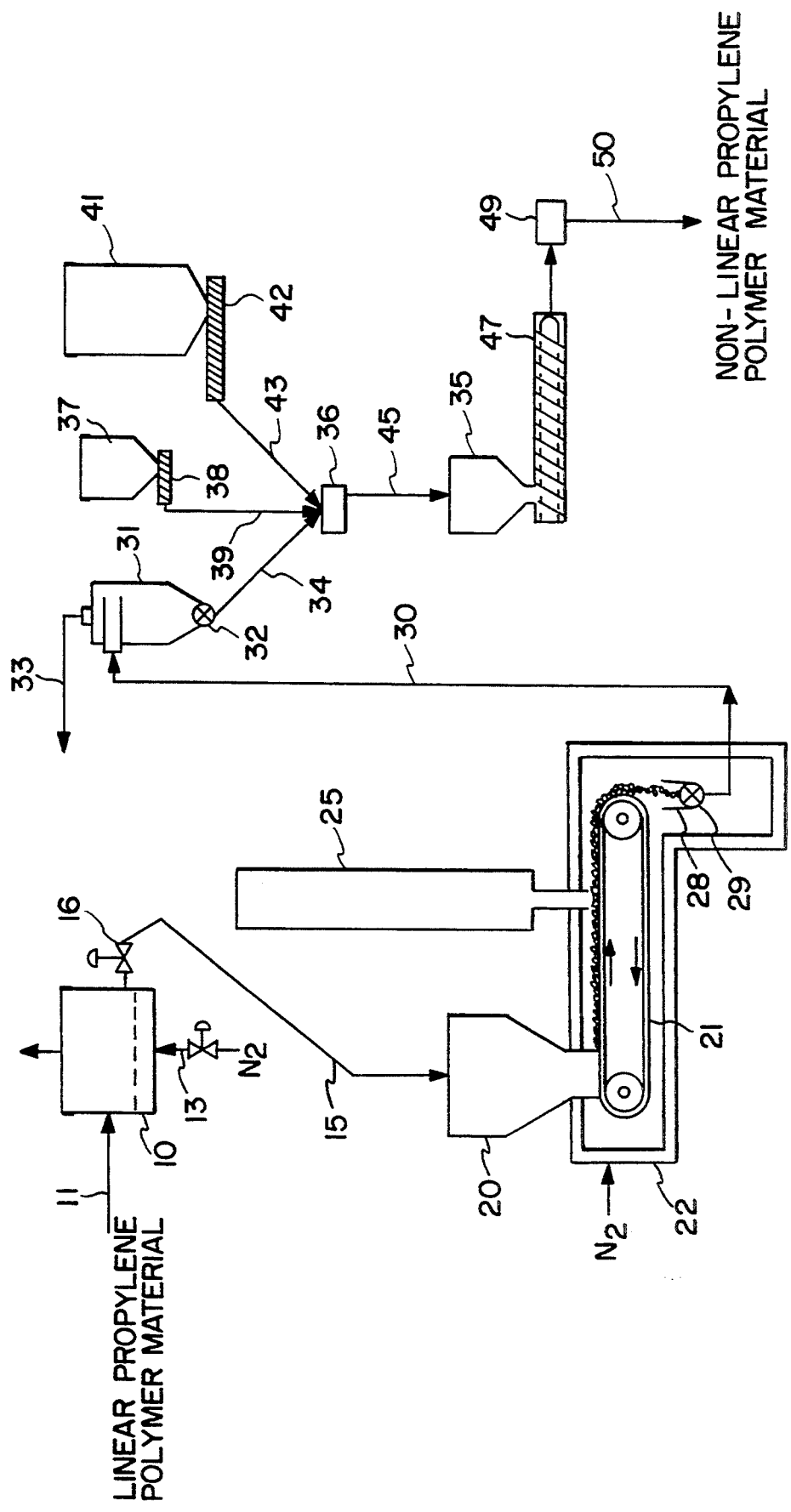
FIG. 1 is a schematic flow sheet of a preferred embodiment of a continuous process for converting, for example, normally solid, linear propylene polymer material into a normally solid, non-linear, substantially gel-free, propylene polymer material with strain hardening and enhanced melt strength.

In greater detail, FIG. 1 depicts a fluid bed unit 10 of conventional construction and operation into which finely divided, high molecular weight, propylene polymer material is introduced by way of conduit 11, nitrogen gas is introduced by way of conduit 13, and from which substantially active oxygen free, high molecular weight, propylene polymer material is removed by way of a solids discharge conduit 15 which also has a solids flow rate controller 16. The solids discharge conduit 15 leads to a conveyer belt feed hopper 20.

The conveyer belt feed hopper 20 is a capped structure of conventional design. It is operated so that its interior contains a nitrogen atmosphere. It has a bottom solids discharge outlet through which the propylene polymer material particles move and form a layer on the top horizontal run of an endless conveyer belt 21.

The conveyer belt 21 is generally horizontally disposed, and continuously moves under normal operative conditions. It is contained in radiation chamber 22. This chamber completely encloses the conveyer belt, and is constructed and operated to establish and maintain a nitrogen atmosphere in its interior.

In combination with the radiation chamber 22 is an electron beam generator 25 of conventional design and operation. Under normal operative conditions it generates a beam of high energy electrons directed to the layer of propylene polymer material particles on the conveyer belt 21. Below the discharge end of the conveyer belt is a solids collector 28 arranged to receive the irradiated propylene polymer material particles falling off the conveyer belt 21 as it turns into its path of opposite travel. Irradiated propylene polymer material particles in the solids collector 28 are removed therefrom by a rotary valve or star wheel 29 and delivered thereby to a solids transfer line 30.

The transfer line 30 leads to a gas-solids separator 31. This unit is of conventional construction and usually is a cyclone type separator. Gas separated therein is removed as by gas discharge conduit 33 while separated solids are discharged therefrom as by a rotary valve or star wheel 32 into a solids discharge line 34. The solids discharge line 34 can lead directly to an extruder hopper 35. However, in the embodiment shown, it leads to a plow blender 36.

In the embodiment shown, there is provided a hopper 37 for such additives as stabilizers or an additive concentrate consisting essentially of finely divided linear polypropylene (or even the polypropylene or other high melt strength, propylene polymer material of this invention) and additives at greater concentrations than in the final product. The additive hopper 37 preferably is conventional, and preferably is constructed and operated to maintain the contents in a nitrogen atmosphere. The discharge end of the additives hopper 37 empties into a screw feeder 38 which feeds material into an additives transfer line 39 that goes to the plow blender 36. In addition, in the embodiment shown, there is provided a bulk feed hopper 41 in which, for example, finely divided or pelletized linear polypropylene is contained. This hopper is conventional, and it too preferably is constructed and operated to maintain the contents in a nitrogen atmosphere. The bulk feed hopper 41 empties into a screw feeder 42 which feeds a solids transfer line 43 that goes to the plow blender 36. In the plow blender 36, the solids fed into it are blended and then discharged into a blended feed line 45 that empties into the extruder hopper 35.

The extruder hopper 35, which feeds an extruder 47, is conventional in construction and operation. It too is an enclosed structure adapted for establishing and maintaining a nitrogen atmosphere in its interior. The extruder 47 is of conventional construction, and is operated in normal fashion. The solids in the extruder hopper 35 move therefrom into the extruder which is operated at a rate of extrusion to result in the period of time between irradiation of the propylene polymer material and its entry into the extruder being sufficient for a significant amount of free-end long chain branches to form. Accordingly, the volume of the extruder hopper 35 is selected to provide, if necessary, the desired amount of hopper storage time to meet this condition. The extruder 47 is designed (length of extruder barrel and screw) and operated at a melt temperature and at a pressure sufficient to maintain the free radical containing propylene polymer material therein for the amount of time needed to deactivate substantially all of the free radicals present.

The thus treated, propylene polymer material is characterized by being non-linear, substantially gel-free, and substantially branched with free-end long chains of propylene polymer units. It can be used as is, or introduced, for example, directly into a pelletizing and cooling unit 49 and conveyed away therefrom as by solids transport line 50 as solid pellets which can be stored and then used, or used without storage.

Similar results are achieved when other specific embodiments of linear, high molecular weight, propylene polymer material are treated according to the continuous process just depicted.

The following examples illustrate the high molecular weight, non-linear, substantially gel-free, propylene polymer material of this invention, and the foregoing preferred embodiment of a process for making it.

The test samples and physical properties of the following working examples and comparative examples were prepared and measured according to the following methods:

| | |
|---|---|
| Melt Flow Rate (MFR) | ASTM D-1238, Condition L |
| Tensile Strength | ASTM-D 638 |
| Weldline Strength (W.L.) | ASTM-D 638, Dual Gated Tensile bar |
| Retained Weldline Strength | ASTM-D 638 |
| Elongation @ Break | ASTM-D 638 |

| | |
|---|---|
| Elongation @ Yield | ASTM-D 638 |
| Elongation @ Break at W.L. | ASTM-D 638 |
| Flexural Modulus | ASTM-D 790 |
| Flexural Strength | ASTM-D 618, Procedure A |
| Haze % | ASTM-D 1003 |
| Notched Izod (ft lb/in) | ASTM-D 256-87 |

The percent gel is determined by a hot-gel filtration test, whereby the polymer is dissolved in a 1% xylene solution at 135° C. and is filtered through a 325 mesh stainless steel screen.

The percent xylene solubles at room temperature, (XSRT), is determined by dissolving 2.5 g of the polymer in 250 ml of xylene in a vessel equipped with a stirrer which is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until constant weight is reached.

EXAMPLE 1

A propylene polymer material, in spherical form, containing 35% of a propylene-ethylene copolymer, (3.3 wt.% polymerized ethylene units), and 65% of an ethylene-propylene copolymer, (71 wt.% polymerized propylene units), having a MFR of 0.98 dg/min., XSRT of 61.7%, and % gel of 0.1, is tumble blended with 0.12% of B225 stabilizer, is extruded on a Haake twin screw extruder at 150 rpm and 450° F., pelletized, and introduced into the fluid bed unit 10 and fluidized with nitrogen for 60 minutes.

The thus treated propylene polymer material is then dropped into the conveyer belt feed hopper 20 which lays it on the moving conveyer belt 21 to form a bed of propylene polymer material 1.5 cm high and 6.25 cm wide. The bed is passed by the conveyer belt 21 through an electron beam generated by a 2 MeV Van de Graff generator operating at a 80 μamp beam current. The conveyor belt speed was adjusted to result in an absorbed surface dose of 2 Mrad. In addition, the active oxygen content of the environment or atmosphere within the enclosed radiation chamber 22 and in the remaining part of the system comprising the irradiated propylene polymer transfer line 30, the solids-gas separator 31, the separator discharge line 34, and the extruder hopper 35, is established and maintained at less than 40 ppm.

After irradiation, the propylene polymer material falls off the end of the conveyer belt 21 into the belt discharge collector 28 and through the rotary valve 29 into the transfer line 30. After separation of gas from the irradiated polymer, the polymer is fed through the separator discharge line 34 into the extruder hopper 35.

The extruder 47 is a 1.87 cm barrel diameter single screw Brabender extruder operated at a 195° C. and 180 rpm. The extruded strands of product from the die are cooled in water and then cold sliced to form pellets.

The pellets were then stabilized with 0.07% PEPQ stabilizer, 0.07% Irganox 1010 2,2-bis[[3-[3,5-bis(1, 1-dimethylethyl)-4-hydroxyphenyl]-1-oxopropoxy]methyl]-1,3-propanediyl- 3,5-bis-(1,1-dimethylethyl)-4-hydroxybenzene-propanoate stabilizer, and 0.25% DSTDP stabilizer. The mixture was then molded on a 1.5 oz. Battenfeld injection molding machine at 475° F. and mold temperature of 135° F.

Properties of the end product of Example 1 are summarized in the following Table I.

CONTROL 1

A propylene polymer material, in spherical form, containing 35% of a propylene-ethylene copolymer, (3.3 wt. % polymerized ethylene units), and 65% of an ethylene-propylene copolymer, (71 wt. % polymerized propylene units), having a MFR of 0.98 dg/min., XSRT of 61.7%, and % gel of 0.1, is tumble blended with 0.12% of Irganox B225 2,2-Bis[[3-[3,5-Bis(1,1-dimethylethyl)-4-hydroxyphenyl]-1-oxopropoxy]methyl]-1,3-propanediyl-3,5-Bis(1,1-dimethyl-ethyl)-4-hydroxybenzene-propanoate stabilizer and tris(2,4-di-tert-butylphenyl) phosphite stabilizer in a 50:50 blend is extruded on a Haake twin screw extruder at 150 rpm and 450° F. and pelletized. The pelletized propylene polymer material was then tumble blended with 0.07% PEPQ stabilizer, 0.07% Irganox 1010 2,2-bis[[3-[3,5-bis(1,1-dimethylethyl)-4-hydroxyphenyl]-1-oxopropoxy]-methyl]-1,3-propanediyl-3,5-bis-(1,1-dimethylethyl)-4-hydroxybenzenepropanoate stabilizer, and 0.25% DSTDP stabilizer. The mixture was then molded on a 1.5 oz. Battenfeld injection molding machine at 475° F. and mold temperature of 135° F.

EXAMPLE 2

Propylene polymer material of the present invention was prepared according to the process set forth in Example 1, except that the bed is passed by the conveyer belt 21 through an electron beam generated by a 2 MeV Van de Graff generator operating at a 230 μamp beam current, instead of 80 μamp; the conveyor belt speed was adjusted to result in an absorbed surface dose of 6 Mrad, instead of 2 Mrad; and the single screw Brabender extruder operated at a 210° C. and 180 rpm, instead of 195° C. as in example 1.

EXAMPLE 3

Propylene polymer material of the present invention was prepared according to the process set forth in Example 2, except that the propylene polymer material was not pelletized prior to irradiation, but remained in spherical form; the bed is 1.6 cm high, instead of 1.5 cm high, and the single screw Brabender extruder operated at a 200° C. and 180 rpm, instead of 210° C. as in Example 2.

CONTROL 2

The propylene polymer material of Example 3 in spherical form, except it has no stabilizers and is not irradiated or extruded.

EXAMPLE 4

A propylene polymer material, in spherical form, containing 40% propylene homopolymer, 40% ethylene-propylene copolymer rubber and 20% semi-crystalline, ethylene-propylene copolymer fraction which is insoluble in xylene at room temperature and an ethylene content of 96%, having a MFR of 0.75 dg/min., XSRT of 40.0%, and % gel of 0.1, is tumble blended with 0.12% of B225 stabilizer, is extruded in a Haake twin screw extruder at 150 rpm and 450° F., pelletized, and introduced into the fluid bed unit 10 and fluidized with nitrogen for 60 minutes.

The thus treated propylene polymer material is then dropped onto the conveyer belt feed hopper 20 which lays it on the moving conveyer belt 21 to form a bed of propylene polymer material 1.5 cm high and 6.25 cm wide. The bed is passed by the conveyer belt 21 through an electron beam generated by a 2 MeV Van de Graff generator operating at a 230 μamp beam current. The conveyor belt speed was adjusted to result in an absorbed surface dose of 6 Mrad. In addition, the active oxygen content of the environment or atmosphere within the enclosed radiation chamber 22 and in the remaining part of the system comprising the irradiated propylene polymer transfer line 30, the solids-gas separator 31, the separator discharge line 34, and the extruder hopper 35, is established and maintained at less than 40 ppm.

After irradiation, the propylene polymer material falls off the end of the conveyer belt 21 into the belt discharge collector 28 and through the rotary valve 29 into the transfer line 30. After separation of gas from the irradiated polymer, the polymer is fed through the separator discharge line 34 into the extruder hopper 35.

The extruder 47 is a 1.87 cm barrel diameter single screw Brabender extruder operated at 232° C. and 180 rpm. The extruded strands of product from the die are cooled in water and then cold sliced to form pellets.

The pellets were then stabilized with 0.07% PEPQ stabilizer, 0.07% Irganox 1010 2,2-bis[[3-[3,5-bis(1,1-dimethylethyl)-4-hydroxyphenyl]-1-oxopropoxy]methyl]-1,3-propanediyl-3,5-bis-(1,1-dimethylethyl)-4-hydroxybenzene-propanoate stabilizer, and 0.25% DSTDP stabilizer. The mixture was then molded on a 1.5 oz. Battenfeld injection molding machine at 475° F. and mold temperature of 135° F.

The properties of the end product are summarized in Table 1.

CONTROL 3

The propylene polymer material of Example 4, except it is not irradiated. The properties are set forth below in Table 1.

TABLE 1

|  | CON* 1 | EX 1 | EX 2 | CON* 2 | EX 3 | CON* 3 | EX 4 |
| --- | --- | --- | --- | --- | --- | --- | --- |
| Dose (Mrad) | 0 | 2 | 6 | 0 | 6 | 0 | 6 |
| % EPR | 65 | 65 | 65 | 65 | 65 | 40 | 40 |
| Tc, Nucleation Temperature (°C.) | 97.9 | 99 | 102.8 | 98.2 | 108.7 | 118.2 | 121.4 |
| Notched IZOD (ft. lb/in) | 5.5 | 5 | 5.7 | — | — | 10.5 | 9.6 |
| Mode of Break | NO BRK | NO BRK | NO BRK | — | — | NO BRK | NO BRK |
| Tensile Strength @ Yield (psi) | 793 | 708 | 693 | — | — | 1356 | 1204 |
| Weldline Strength (psi) | 686 | 663 | 667 | — | — | 997 | 1055 |
| Retained Strength (%) | 86.5 | 93.6 | 96.2 | — | — | 73.5 | 87.6 |
| Elongation at Yield (%) | 28.9 | 30.2 | 29.0 | — | — | 31.3 | 29.6 |
| Elongation to Break (%) | 1146 | 1100 | 1100 | — | — | 1008 | 960 |
| Elongation to Break @ W.L. (%) | 1145 | 1068 | 841 | — | — | 19.3 | 57.2 |
| Flex Modulus (Kpsi) | 18.0 | 14.9 | 14.2 | — | — | 58.2 | 49.4 |
| Flex Strength (psi) | 927 | 790 | 772 | — | — | 1799 | 1573 |
| M.F.R. | 0.98 | 1.3 | 1.1 | 0.8 | 0.2 | 0.75 | 0.3 |
| Melt Tension (cN) | 6.1 | 7.1 | 16.0 | — | 22.3 | — | — |
| Haze (%) | 29 | — | 21 | — | — | — | — |
| XSRT (%) | 61.7 | 54.6 | 39.7 | 67.3 | 45.8 | 40.0 | 22.3 |
| % GEL | 0.1 | 0.3 | 0.2 | 0.1 | 2.6 | 0.1 | 1.0 |

*CON = CONTROL

It can be seen in Table 1 that Examples 1–4 of the present invention have improved weldline strength, retained strength, and melt tension, with little or no change in tensile strength @ yield, as compared to Controls 1–3, which were not irradiated.

EXAMPLES 5–12 AND CONTROLS 4 AND 5

A propylene polymer composition, in spherical form, containing (a) 40% propylene homopolymer, (b) 40% ethylene-propylene copolymer rubber and (c) 20% semi-crystalline, ethylene-propylene copolymer fraction which is insoluble in xylene at room temperature and having an ethylene content of 96%, a MFR of 0.75 dg/min., XSRT of 40.0%, and % gel of 0.1, is tumble blended with 0.12% of B225 stabilizer is extruded on a Haake twin screw extruder at 150 rpm and 450° F., pelletized, and introduced into the fluid bed unit 10 and fluidized with nitrogen for 60 minutes.

The thus treated propylene polymer material is then dropped onto the conveyer belt feed hopper 20 which lays it on the moving conveyer belt 21 to form a bed of propylene polymer material 1.5 cm high and 15 cm wide. The bed is passed by the conveyer belt 21 through an electron beam generated by a 2 MeV Van de Graff generator operating at a 230 μamp beam current. The conveyor belt speed was adjusted to result in an absorbed surface dose of 1 Mrad. In addition, the active oxygen content of the environment or atmosphere within the enclosed radiation chamber 22 and in the remaining part of the system comprising the irradiated propylene polymer transfer line 30, the solids-gas separator 31, the separator discharge line 34, the blender 36, the blender discharge line 45 and the extruder hopper 35, is established and maintained at less than 40 ppm.

After irradiation, the propylene polymer material falls off the end of the conveyer belt 21 into the belt discharge collector 28 and through the rotary valve 29 into the transfer line 30. After separation of gas from the irradiated polymer, the polymer is fed through the separator discharge line 34 into the blender 36. In these examples, a finely divided additive concentrate, consisting essentially of a linear polypropylene (100 parts by weight), conventional phenolic antioxidant (10.1 parts by weight), and calcium stearate (7.0 parts by weight), from the additive hopper 37 is added by way of the additives transfer line 39 to the blender 36 at a rate of 3 parts by weight per 100 parts of the irradiated polymer. The resulting blend is then fed by way of the blender discharge line 45 from the blender 36 into the extruder feed hopper 35.

The extruder 47 is a 6.4 cm barrel diameter single screw Sterling extruder operated at a 240° C. and 180 rpm. The extruded strands of product from the die are cooled in water and then cold sliced to form pellets.

Properties of the end products of Examples 5-12 and those of Controls 4 and 5, a non-irradiated polymer described above, are summarized in the following Table 2.

gel contents than the heterophasics of Control 6, 7 and 8, relative to the radiation dose. This is totally unexpected since the heterophasic resins of the present invention have a higher rubber content, 65%, 65% and 40%, respectively, than the heterophasic of Control 6, 7 and 8, which have 12% rubber.

EXAMPLE 13 and 14

This example illustrates the use of a propylene polymer material of the present invention in a foam application. The composition of this example contained the product of Example 2 of the present invention.

Tumble blended were 30% of the product of Example 2, 70% of an irradiated propylene homopolymer having a MFR of 3-5, melt strength of 16-18 Cn, XSRT of 4-4.5%, 0.20 pph mineral oil and 0.75 pph of Vertal 350 talc (nucleating agent) before processing. Downstream of the hopper CFC 114 chlorofluoro-carbon blowing agent (B.A.) was pumped into the molten mixture at two different levels,(60 and 80% pump stroke that corresponds to 6 and 8% wt. of the blowing agent).

The processing conditions are set forth in Table 4 and the foam performance data are set forth in Table 5.

TABLE 4

| Extruder Temperatures (°F.) | | | | Adaptor (°F.) | Die (°F.) | Melt Temp. (°F.) | Melt Pressure | | Blowing Ing. P. (psi) | Agent Pump stroke (%) |
|---|---|---|---|---|---|---|---|---|---|---|
| 1 | 2 | 3 | 4 | | | | Adaptor (psi) | Die (psi) | | |
| 375 | 405 | 375 | 325 | 310 | 300 | 320 | 1000 | 200 | 650 | 60,80 |

TABLE 2

| | Dose (Mrad) | % O₂ | MFR (I₂ @ 230° C.) | Tensile Str. @ Break | Elongation @ Break | Tension Set After Break 20°/min; ~30 min Relaxation | |
|---|---|---|---|---|---|---|---|
| | | | | | | % Permanent Deformation | Permanent Deformation as a % of Break Elongation |
| CON 4 | 0 | 40 ppm | 0.95 | 1615 psi | 285% | 135 | 47 |
| EX 5 | 1 | 40 ppm | 0.19 | 1640 psi | 224% | 72 | 32 |
| EX 6 | 2 | 40 ppm | 0.12 | 1876 psi | 148% | 40 | 27 |
| EX 7 | 3 | 40 ppm | 0.08 | 1969 psi | 135% | 33 | 24 |
| EX 8 | 5 | 40 ppm | 0.07 | 1850 psi | 87% | 17 | 19 |
| CON 5 | 0 | 2% | 0.94 | 1598 psi | 262% | 116 | 45 |
| EX 9 | 1 | 2% | 0.31 | 1545 psi | 241% | 89 | 36 |
| EX 10 | 2 | 2% | 0.22 | 1739 psi | 172% | 52 | 30 |
| EX 11 | 3 | 2% | 0.28 | 1781 psi | 158% | 45 | 28 |
| EX 12 | 5 | 2% | 0.37 | 1717 psi | 102% | 25 | 25 |

AS demonstrated above in Table 2, Examples 5-12 have better tensile strength @ break and higher elastic recovery than Controls 4 and 5.

CONTROLS 6-8

Profax 7901 polypropylene impact modified with 12% ethylene-propylene copolymer rubber having an over all ethylene content of 7.8% was irradiated at various dose levels according to the radiation method described above.

TABLE 3

| | CON 6 | EX 1 | CON 7 | EX 2 | EX 4 | CON 8 |
|---|---|---|---|---|---|---|
| Dose (Mrad) | 3 | 2 | 4.5 | 6 | 6 | 6 |
| % Gel | 2.5 | 0.3 | 4.4 | 0.2 | 1.0 | 5.3 |

It can be seen in Table 3 that Examples 1, 2 and 4, all heterophasic resins of the present invention, have lower

TABLE 5

| | B.A. Level % | MFR % | DENSITY lb/ft³ | NUMBER OF CELLS |
|---|---|---|---|---|
| Example 13 | (6%) | 2.76 | 8.49 | 10–11 |
| Example 14 | (8%) | 2.76 | 6.64 | 9–10 |

It can be seen that the blend shows good processability and foam performance, with good foam density and cell structure.

Hence, the propylene polymer material of this invention has utility in melt processing operations to form useful articles, such as foam sheet, for use in any applications where foam sheet materials are employed, such as foam cushioning or packaging and foam beads.

The propylene polymer material also can be used for other applications, such as thermoforming, melt extrusion, sheet extrusion and coextrusion. Indeed, the strain hardening propylene polymer material of this invention is useful in all melt processing operations in which a high molecular weight, propylene polymer material of enhanced melt strength is desired.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

The expression "consisting essentially of" as used in this specification excludes an unrecited substance at a concentration sufficient to substantially adversely affect the essential properties and characteristics of the composition of the matter being defined, while permitting the presence of one or more unrecited substances at concentrations insufficient to substantially adversely affect said essential properties and characteristics.

We claim:

1. An irradiated normally solid, high molecular weight, non-linear, substantially gel-free, propylene polymer material having a strain hardening elongational viscosity and enhanced melt strength as indicated by a melt tension of greater than or equal to 7.1 selected from the group consisting of:

(1) a propylene polymer composition consisting essentially of:
   (a) from 10 to 50% of a propylene homopolymer having an isotactic index of from 80 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99% propylene and having an isotactic index greater than 80 to 99%,
   (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98% of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and
   (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10% and the amount of ethylene and alpha-olefin present is from 20% to less than 40%; and (iii) ethylene and an alpha-olefin, as defined in (a)(ii), containing from 20 to less than 40% of the alpha-olefin, and optionally containing 0.5 to 10% of a diene, said copolymer fraction being soluble in xylene at ambient temperature, and having an intrinsic viscosity of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%; and (2) a propylene polymer composition consist essentially of:
   (a) 10–60 parts by weight of homopolymer polypropylene with isotactic index greater than 90 to 99, or of crystalline propylene copolymer with ethylene, with a $CH_2=CHR$ olefin where R is a 2–6 carbon alkyl radical, or combinations thereof, containing over 85% by weight of propylene and having an isotactic index greater than 85 to 94%;
   (b) 8–40 parts by weight of a semi-crystalline, polymer fraction containing ethylene and propylene, having an ethylene content greater than 50% and insoluble in xylene at room temperature;
   (c) 30–60 parts by weight of an amorphous ethylenepropylene copolymer fraction containing optionally small proportions of a diene, soluble in xylene at room temperature and containing 40 to 70% by weight ethylene.

2. The propylene polymer material of claim 1, consisting of a propylene polymer composition consisting essentially of:
   (a) from 10 to 50% of a propylene homopolymer having an isotactic index of from 80 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99% propylene and having an isotactic index greater than 80 to 99%,
   (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98% of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and
   (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10% and the amount of ethylene and alpha-olefin present is from 20% to less than 40%; and (iii) ethylene and an alpha-olefin, as defined in (a)(ii), containing from 20 to less than 40% of the alpha-olefin, and optionally containing 0.5 to 10% of a diene, said copolymer fraction being soluble in xylene at ambient temperature, and having an intrinsic viscosity of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%.

3. The propylene polymer material of claim 2, consisting of a propylene polymer composition consist essentially of:
   (a) 10–60 parts by weight of homopolymer polypropylene with isotactic index greater than 90 to 99, or of crystalline propylene copolymer with ethylene, with a $CH_2=CHR$ olefin where R is a 2–6 carbon alkyl radical, or combinations thereof, containing over 85% by weight of propylene and having an isotactic index greater than 85 to 94%;
   (b) 8–40 parts by weight of a semi-crystalline, polymer fraction containing ethylene and propylene, having an ethylene content greater than 50% and insoluble in xylene at room temperature;
   (c) 30–60 parts by weight of an amorphous ethylene-propylene copolymer fraction containing optionally small proportions of a diene, soluble in xylene at room temperature and containing 40 to 70% by weight ethylene.

4. The propylene polymer material of claim 2, wherein component (a) is a copolymer of propylene and ethylene containing from 85 to 99% propylene.

5. The propylene polymer material of claim 4, wherein (a) is (a) propylene homopolymer.

6. An extrusion coating composition comprising an irradiated normally solid, high molecular weight, non-linear, substantially gel-free, propylene polymer material, having strain hardening elongational viscosity and enhanced melt strength as indicated by a melt tension of greater than or equal to 7.1 selected from the group consisting essentially of:
   (1) a propylene polymer composition consisting essentially of:
      (a) from 10 to 50% of a propylene homopolymer having an isotactic index of from 80 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99% propylene and having an isotactic index greater than 80 to 99%,
      (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98% of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and
      (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10% and the amount of ethylene and alpha-olefin present is from 20% to less than 40%; and (iii) ethylene and an alpha-olefin, as defined in (a)(ii), containing from 20 to less than 40% of the alpha-olefin, and optionally containing 0.5 to 10% of a diene, said copolymer fraction being soluble in xylene at ambient temperature, and having an intrinsic viscosity of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%; and
   (2) a propylene polymer composition consist essentially of:
      (a) 10–60 parts by weight of homopolymer polypropylene with isotactic index greater than 90to 99, or of crystalline propylene copolymer with ethylene, with a $CH_2=CHR$ olefin where R is a 2–6 carbon alkyl radical, or combinations thereof, containing over 85% by weight of propylene and having an isotactic index greater than 85 to 94%;
      (b) 8–40 parts by weight of a semi-crystalline, polymer fraction containing ethylene and propylene, having an ethylene content greater than 50% and insoluble in xylene at room temperature;
      (c) 30–60 parts by weight of an amorphous ethylene-propylene copolymer fraction containing optionally small proportions of a diene, soluble in xylene at room temperature and containing 40 to 70% by weight ethylene.

7. A film forming composition comprising an irradiated normally solid, high molecular weight, non-linear, substantially gel-free, propylene polymer material having strain hardening elongational viscosity and enhanced melt strength as indicated by a melt tension of greater or equal to 7.1 selected from the group consisting essentially of:
   (1) a propylene polymer composition consisting essentially of:
      (a) from 10 to 50% of a propylene homopolymer having an isotactic index of from 80 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99% propylene and having an isotactic index greater than 80 to 99%,
      (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98% of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10% and the amount of ethylene and alpha-olefin present is from 20% to less than 40%; and (iii) ethylene and an alpha-olefin, as defined in (a)(ii), containing from 20 to less than 40% of the alpha-olefin, and optionally containing 0.5 to 10% of a diene, said copolymer fraction being soluble in xylene at ambient temperature, and having an intrinsic viscosity of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%; and (2) a propylene polymer composition consist essentially of:

(a) 10–60 parts by weight of homopolymer polypropylene with isotactic index greater than 90 to 99, or of crystalline propylene copolymer with ethylene, with a $CH_2=CHR$ olefin where R is a 2–6 carbon alkyl radical, or combinations thereof, containing over 85% by weight of propylene and having an isotactic index greater than 85 to 94%;

(b) 8–40 parts by weight of a semi-crystalline, polymer fraction containing ethylene and propylene, having an ethylene content greater than 50% and insoluble in xylene at room temperature;

(c) 30–60 parts by weight of an amorphous ethylene-propylene copolymer fraction containing optionally small proportions of a diene, soluble in xylene at room temperature and containing 40 to 70% by weight ethylene.

8. Film comprising an irradiated normally solid, high molecular weight, non-linear, substantially gel-free, propylene polymer material having strain hardening elongational viscosity and enhanced melt strength as indicated by a melt tension of greater or equal to 7.1 selected from the group consisting essentially of:

(1) a propylene polymer composition consisting essentially of:

(a) from 10 to 50% of a propylene homopolymer having an isotactic index of from 80 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99% propylene and having an isotactic index greater than 80 to 99%, (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98% of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10% and the amount of ethylene and alpha-olefin present is from 20% to less than 40%; and (iii) ethylene and an alpha-olefin, as defined in (a)(ii), containing from 20 to less than 40% of the alpha-olefin, and optionally containing 0.5 to 10% of a diene, said copolymer fraction being soluble in xylene at ambient temperature, and having an intrinsic viscosity of from 1.7 to 3.0 dl/g, wherein the total amount of ethylene units or said alpha-olefin units or of ethylene and said alpha-olefin units when both are present in the composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%; and (2) a propylene polymer composition consist essentially of:

(a) 10–60 parts by weight of homopolymer polypropylene with isotactic index greater than 90 to 99, or of crystalline propylene copolymer with ethylene, with a $CH_2=CHR$ olefin where R is a 2–6 carbon alkyl radical, or combinations thereof, containing over 85% by weight of propylene and having an isotactic index greater than 85 to 94%;

(b) 8–40 parts by weight of a semi-crystalline, polymer fraction containing ethylene and propylene, having an ethylene content greater than 50% and insoluble in xylene at room temperature;

(c) 30–60 parts by weight of an amorphous ethylene-propylene copolymer fraction containing optionally small proportions of a diene, soluble in xylene at room temperature and containing 40 to 70% by weight ethylene.

9. An extrusion coating composition of claim 6, further comprising from 5 to 95% of a normally solid, predominately isotactic, semi-crystalline, linear propylene polymer material.

10. A film forming composition of claim 7, further comprising from 5 to 95% of a normally solid, predominately isotactic, semi-crystalline, linear propylene polymer material.

11. A film comprising the composition of claim 8, further comprising from 5 to 95% of a normally solid, predominately isotactic, semi-crystalline, linear propylene polymer material.

* * * * *